W. M. JACKSON.

GAS-STOVE.

No. 7,474. Reissued Jan. 23, 1877.

WITNESSES.

R. W. Eaton

S. P. Langworthy

INVENTOR.

Walter M. Jackson,
by Joseph A. Miller
Attorney.

N. PETERS, PHOTO-LITHOGRAPHER, WASHINGTON, D. C.

UNITED STATES PATENT OFFICE.

WALTER M. JACKSON, OF PROVIDENCE, RHODE ISLAND, ASSIGNOR OF ONE-HALF INTEREST TO HERBERT N. SMITH.

IMPROVEMENT IN GAS-STOVES.

Specification forming part of Letters Patent No. 171,814, dated January 4, 1876; reissue No. 7,474, dated January 23, 1877; application filed December 9, 1876.

*To all whom it may concern:*

Be it known that I, WALTER M. JACKSON, of the city of Providence, county of Providence, and State of Rhode Island, have invented new and useful Improvements in Gas-Stoves; and I do hereby declare that the following is a full, clear, and exact description of the same, reference being had to the accompanying drawings, forming part of this specification.

Figure 2:
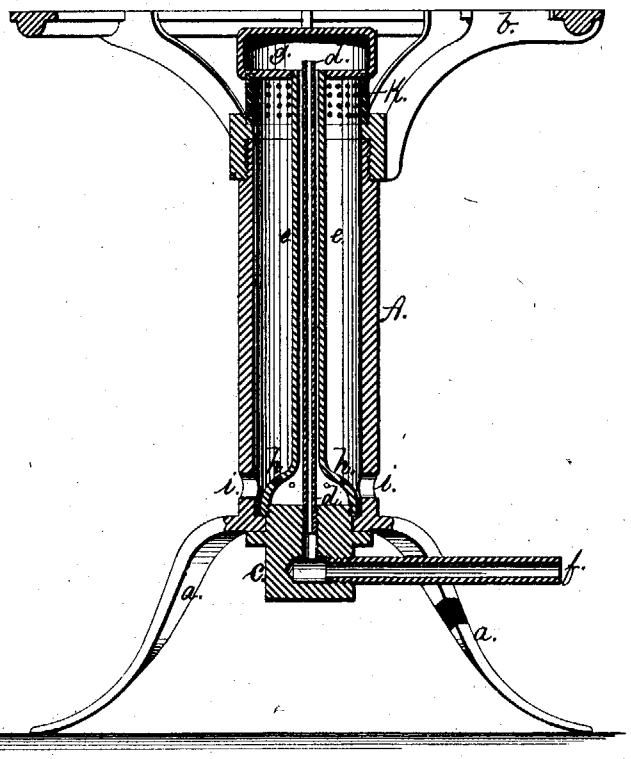
Figure 1:
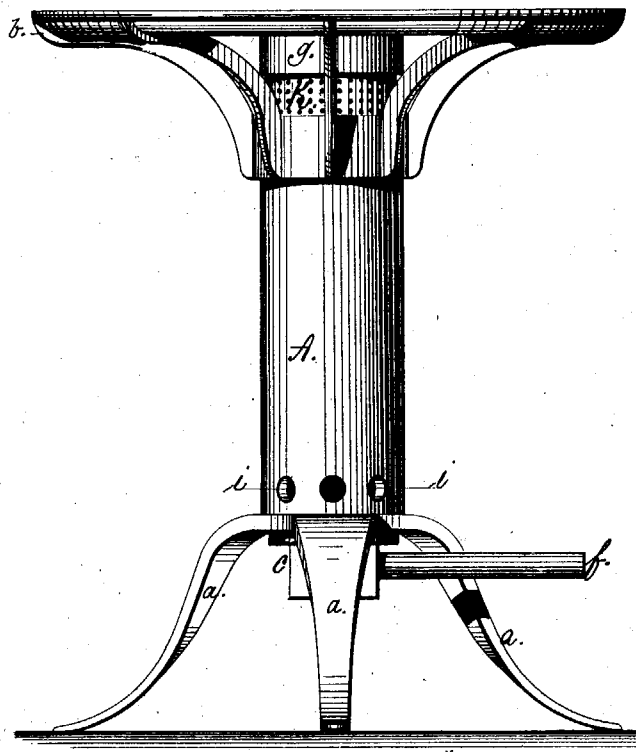

Figure 1 is an elevation of my improved gas-stove, and Fig. 2 is a vertical central section of the same.

My invention consists in the new method for burning hydrocarbon gas, or the ordinary gas supplied in cities, by first heating the gas, and then mixing the heated gas with air, thus supplying the proper quantity of oxygen required for the perfect combustion of the gas throughout the whole mass, and not, as is usually the case, in streams or layers without the required atomic mixture.

The invention further consists in the peculiar construction of a stove or burner, in which a close retort or heating-chamber is provided, which, being surrounded by the burning flame, and connected with the gas-inlet and also with the gas-outlet, heats and expands the gas before the air is mixed with the same.

In the drawings, A represents an upright tubular body, supported at its lower end on legs *a a*, and provided at its upper end with a skeleton plate, *b*, arranged to sustain the vessel or other object to be heated. The lower end of the body A is closed by a plug, *c*, and the said plug, within the body, is arranged to receive the concentric vertical tubes *d* and *e*. The inner tube, *d*, communicates with the gas-inlet *f* at its lower end, and at its upper end opens into a closed retort or chamber, *g*, screwed fast to the upper end of the tube *e*, above the upper end of the tube A, as shown. The lower end of the tube *e* is enlarged, as shown, and provided with a series of outlet-openings, *h*, to direct the gas into the foot of the body A, which latter is provided with a series of openings, *i*, to admit atmospheric air. Between the upper end of the body A and the under side of the retort *g* a perforated-metal or gauze cylinder, *k*, is secured, as shown in both figures.

The operation of this improved burner is as follows: The gas, entering at *f*, ascends within the central tube *d* into the retort *g*. This retort, being surrounded by the flame, is maintained at a sufficiently-high temperature to heat the gas so that its volume will expand to about three times the original volume; and in this heated and expanded condition it passes down through the annular space between the pipes or tubes *d* and *e*, and escapes through the openings *h h* into the annular space between the cylinder A and tube *e*. This heated and expanded gas is now, in divided streams, made to enter the current of air in the annular space, and, being expanded and heated, will readily mix with a much larger quantity of air than would be possible with cold gas; and as by the mixture with the air the gas will be reduced in temperature, the mechanical union will be more nearly uniform, so that each atom of gas will have more nearly its required quantity of air than when both are mixed at a uniform temperature, and much more nearly than when mixed with cold gas.

As the gas is thus highly heated before it is mixed with the air, its capacity to absorb moisture from the atmospheric air is increased, and the product resulting from the mixture is both richer in hydrogen and oxygen than when mixed cold; and as the object of the invention is to produce a dark heating-flame, a more intense heat is produced with a smaller quantity of gas.

The upper portion of the cylinder A, and also of the tube *e*, are, when in use, heated to a high temperature. The gas and air mixed reach the perforated-metal or gauze ring at a high temperature, and will burn freely on the outside of the ring *k*.

The combustion of the gas is so perfect in this burner that no unconsumed gas can be detected by the usual tests. It may, therefore, be arranged and used for heating rooms, and for other purposes for which the ordinary burner cannot be used on account of the unwholesome effect produced by the unconsumed gas. For all purposes where intense heat is to be produced this method of burning gas can be readily adapted, (as the retort may be of any desired shape,) provided it is arranged so as to be heated by the burning gas, and the gas compelled to pass through the retort before the same is mixed with the atmospheric air.

Having thus described my invention, I claim as new and desire to secure by Letters Patent—

1. In a gas-stove, the combination, with the burner, having an air-passage leading thereto, of a closed retort, arranged, relatively to the burner, to be in direct contact with the flame, said retort provided with inlet and outlet pipes, located within the air-passage to the burner, substantially as and for the purpose set forth.

2. The combination, in a gas-burner, with the retort *g*, of an inlet and outlet aperture below its top, a gas and air mixing chamber, and flame-orifices, arranged as shown and described, so that the flame will heat the retort, as and for the purpose specified.

3. The combination, with a gas-burner and a closed retort, arranged relatively to the burner, to be in direct contact with the flame, of a perforated pipe leading from the retort, and a perforated pipe connected to the burner, whereby the heated gas and air are mixed before reaching the burner, substantially as and for the purpose set forth.

4. In a gas-stove, the combination, with a closed retort, surrounded with flame-orifices, of the inlet-pipe *d* and outlet-pipe *e*, and cylinder A, provided with openings at or near its bottom, the whole arranged as shown and described, so that the gas will be delivered to the retort, and from the same will pass down the pipe *e*, and again ascend, while mixing with the air, to the flame-orifices, as and for the purpose described.

5. The gas-stove consisting of the body A, the concentric tubes *d* and *e*, the latter provided with the openings *h h*, the retort *g*, and the gauze *k*, combined and arranged as shown.

6. In combination with the retort *g*, supported on the gauze *k*, seated on the body A, the tube *e*, arranged as shown, serving both to conduct the gas from the retort, and to secure the retort in place, as shown.

WALTER M. JACKSON.

Witnesses:
JOSEPH A. MILLER,
H. F. HORTON.